(12) United States Patent
Motoyama et al.

(10) Patent No.: US 12,489,487 B2
(45) Date of Patent: Dec. 2, 2025

(54) TRANSMISSION/RECEPTION SWITCHING CIRCUIT AND WIRELESS COMMUNICATION TERMINAL

(71) Applicant: SONY SEMICONDUCTOR SOLUTIONS CORPORATION, Kanagawa (JP)

(72) Inventors: Hideshi Motoyama, Kanagawa (JP); Shota Hayakawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 271 days.

(21) Appl. No.: 18/257,557

(22) PCT Filed: Oct. 28, 2021

(86) PCT No.: PCT/JP2021/039778
§ 371 (c)(1),
(2) Date: Jun. 14, 2023

(87) PCT Pub. No.: WO2022/137799
PCT Pub. Date: Jun. 30, 2022

(65) Prior Publication Data
US 2024/0039577 A1 Feb. 1, 2024

(30) Foreign Application Priority Data
Dec. 23, 2020 (JP) ................................. 2020-213767

(51) Int. Cl.
*H04B 1/48* (2006.01)
*H01P 1/15* (2006.01)
(Continued)

(52) U.S. Cl.
CPC ................. *H04B 1/48* (2013.01); *H01P 1/15* (2013.01); *H03F 3/24* (2013.01); *H03F 2200/451* (2013.01)

(58) Field of Classification Search
None
See application file for complete search history.

(56) References Cited

U.S. PATENT DOCUMENTS 7,092,677 B1    8/2006  Zhang et al.
7,877,063 B2 *  1/2011  Kim ........................ H03F 3/245
                                                   330/296

(Continued)

FOREIGN PATENT DOCUMENTS

JP    11-205188 A     7/1999
JP    2012-80187 A    4/2012
WO    02/067451 A1    8/2002

OTHER PUBLICATIONS

International Search Report and Written Opinion of PCT Application No. PCT/JP2021/039778, issued on Jan. 11, 2022, 08 pages of ISRWO.

*Primary Examiner* — Pablo N Tran
(74) *Attorney, Agent, or Firm* — CHIP LAW GROUP

(57) ABSTRACT

Performance is improved in a wireless communication terminal in which an antenna is connected to a transmission circuit and a reception circuit. A transmission/reception switching circuit includes a first N-type transistor and a second N-type transistor. The first N-type transistor has a drain connected to the antenna and a gate to which a constant voltage is applied. Furthermore, the second N-type transistor has a drain connected to a source of the first N-type transistor and a gate to which a transmission signal is input. Furthermore, the second N-type transistor supplies a reception signal from one of a source and the drain.

17 Claims, 16 Drawing Sheets

(51) Int. Cl.
   *H03F 3/24* (2006.01)
   *H04B 1/00* (2006.01)
   *H04B 1/44* (2006.01)

(56) References Cited

U.S. PATENT DOCUMENTS

| | | | |
|---|---|---|---|
| 7,936,237 B2 * | 5/2011 | Park | H01P 1/213 |
| | | | 333/101 |
| 8,643,427 B2 * | 2/2014 | Tan | H03K 17/687 |
| | | | 327/434 |
| 9,118,398 B1 * | 8/2015 | Han | H03K 3/012 |
| 9,450,639 B2 * | 9/2016 | Zhang | H04B 1/006 |
| 9,780,828 B2 * | 10/2017 | Afsahi | H04B 1/44 |
| 9,838,068 B2 * | 12/2017 | Kunihiro | H03F 3/217 |
| 10,267,773 B2 * | 4/2019 | Nakayama | H10N 39/00 |
| 10,355,741 B2 * | 7/2019 | Khatib | H04B 1/48 |
| 10,720,956 B2 * | 7/2020 | Callender | H03F 3/21 |

* cited by examiner

TRANSMISSION/RECEPTION SWITCHING CIRCUIT AND WIRELESS COMMUNICATION TERMINAL

CROSS REFERENCE TO RELATED APPLICATIONS

This application is a U.S. National Phase of International Patent Application No. PCT/JP2021/039778 filed on Oct. 28, 2021, which claims priority benefit of Japanese Patent Application No. JP 2020-213767 filed in the Japan Patent Office on Dec. 23, 2020. Each of the above-referenced applications is hereby incorporated herein by reference in its entirety.

TECHNICAL FIELD

The present technology relates to a transmission/reception switching circuit. Specifically, the present technology relates to a transmission/reception switching circuit that switches transmission and reception and a wireless communication terminal.

BACKGROUND ART

Conventionally, when one antenna is connected to a transmission circuit and a reception circuit, a transmission/reception switching circuit that switches transmission and reception is disposed at a preceding stage of the antenna. For example, a transmission/reception switching circuit in which a transmission line having a ¼ wavelength is inserted between an antenna and each of a transmission circuit and a reception circuit has been proposed (see, for example, Patent Document 1).

CITATION LIST

Patent Document

Patent Document 1: Japanese Patent Application Laid-Open No. 2014-49964

SUMMARY OF THE INVENTION

Problems to be Solved by the Invention

In the above-described conventional technique, the transmission line having the ¼ wavelength is inserted to realize a low-loss transmission/reception system. However, in a case where the transmission line of the ¼ wavelength is to be realized at a wireless frequency of about 1 gigahertz (GHz), a line length of about 75 millimeters (mm) is required, and it is unrealistic to configure the transmission line in an integrated circuit (IC). Furthermore, even in a case where the transmission line is disposed outside the IC, the transmission line has a size that cannot be ignored. Moreover, since the line length of the transmission line of the ¼ wavelength varies depending on the wireless frequency, the line length is inherently subject to band limitation. As described above, in the above-described transmission/reception circuit, it is difficult to improve performance of a wireless communication terminal provided with the circuit.

The present technology has been developed in view of such a situation, and an object thereof is to improve performance in a wireless communication terminal that connects an antenna to a transmission circuit and a reception circuit.

Solutions to Problems

The present technology has been made to solve the above-described problems, and a first aspect thereof is a transmission/reception circuit including: a first N-type transistor having a drain connected to an antenna and a gate to which a constant voltage is applied; and a second N-type transistor having a drain connected to a source of the first N-type transistor, having a gate to which a transmission signal is input, and supplying a reception signal from one of a source and the drain.

This brings about an effect of improving performance of the transmission/reception switching circuit.

Furthermore, in the first aspect, a first P-type transistor, a second P-type transistor, a third P-type transistor, and a third N-type transistor may be further included. The transmission signal may include in-phase first and second transmission signals. A third inverter including the third P-type transistor and the third N-type transistor and a second inverter including the second P-type transistor and the second N-type transistor may be connected in series to a power supply terminal. The first transmission signal may be input to an input terminal of the third inverter. An output terminal of the third inverter may be connected to a source of the first P-type transistor. The second transmission signal may be input to an input terminal of the second inverter. An output terminal of the second inverter may be connected to the source of the first N-type transistor. An input terminal of a first inverter including the first P-type transistor and the first N-type transistor may be connected to a connection node of the second and third inverters. An output terminal of the first inverter may be connected to the antenna. This brings about an effect that a part of a power amplifier unit including the three inverters functions as a switch.

Furthermore, in the first aspect, a first in-amplifier capacitor inserted between the input terminal of the second inverter and the input terminal of the third inverter, and a second in-amplifier capacitor inserted between the output terminal of the second inverter and the output terminal of the third inverter may be further included. This brings about an effect that compatibility between the first and second transmission signals is secured.

Furthermore, in the first aspect, a direct current (DC) cut capacitor inserted between the output terminal of the first inverter and the antenna may be further included. This brings about an effect that a DC component is cut.

Furthermore, in the first aspect, a matching circuit inserted between the output terminal of the first inverter and the antenna may be further included. This brings about an effect that impedance is matched.

Furthermore, in the first aspect, a filter circuit inserted between the output terminal of the first inverter and the antenna may be further included. This brings about an effect that the transmission signal is filtered.

Furthermore, in the first aspect, a switching unit that opens and closes a path between the source of the second N-type transistor and a ground terminal according to a predetermined enable signal may be further included. This brings about an effect that the source of the second N-type transistor and the ground terminal are short-circuited.

Furthermore, in the first aspect, the switching unit may open and close the path between the source of the second N-type transistor and the ground terminal according to the enable signal. This brings about an effect that a reception circuit is insulated.

Furthermore, in the first aspect, the switching unit may further include the predetermined number of fifth transistors that open and close a path between the source of the second N-type transistor and a reception circuit that processes the reception signal according to the enable signal. This brings about an effect that the reception circuit is insulated.

Furthermore, in the first aspect, the switching unit may further include a shunt switch that opens and closes a path between the ground terminal and a connection node of the fifth transistor and the reception circuit according to the enable signal. This brings about an effect of improving insulation of the reception circuit.

Furthermore, in the first aspect, an inductor inserted between a power supply terminal and the drain of the first N-type transistor may be further included. This brings about an effect that a power amplifier unit in which cascode-connected transistors are arranged functions as a switch.

Furthermore, in the first aspect, a matching circuit inserted between the antenna and a connection node of the first N-type transistor and the inductor may be further included. This brings about an effect that impedance is matched.

Furthermore, in the first aspect, a filter circuit inserted between the antenna and a connection node of the first N-type transistor and the inductor may be further included. This brings about an effect that impedance is matched.

Furthermore, in the first aspect, the predetermined number of fourth transistors that open and close a path between the source of the second N-type transistor and a ground terminal according to the enable signal may be further included. This brings about an effect that a withstand voltage of the second N-type transistor is secured.

Furthermore, in the first aspect, a switching unit that opens and closes a path between a connection node of the first and second N-type transistors and a reception circuit that processes the reception signal according to a predetermined enable signal may be further included. This brings about an effect that the reception circuit is insulated.

Furthermore, in the first aspect, the switching unit may further include the predetermined number of fifth transistors that open and close the path between the connection node of the first and second N-type transistors and the reception circuit according to the enable signal. This brings about an effect that the reception circuit is insulated.

Furthermore, a second aspect of the present technology is a wireless communication terminal including: a first N-type transistor having a drain connected to an antenna and a gate to which a constant voltage is applied; a second N-type transistor having a drain connected to a source of the first N-type transistor, having a gate to which a transmission signal is input, and supplying a reception signal from one of a source and the drain; a transmission circuit that supplies the transmission signal; and a reception circuit that processes the reception signal. This brings about an effect of improving performance of the wireless communication terminal.

MODES FOR CARRYING OUT THE INVENTION

Hereinafter, modes for carrying out the present technology (hereinafter referred to as embodiments) will be described. The explanation will be given in the following order.

1. First Embodiment (an example of arranging three inverters in a power amplifier unit)
2. Second Embodiment (an example of arranging cascode transistors in a power amplifier unit)
3. Application Example

1. First Embodiment

[Configuration Example of Wireless Communication Terminal]

Figure 1:
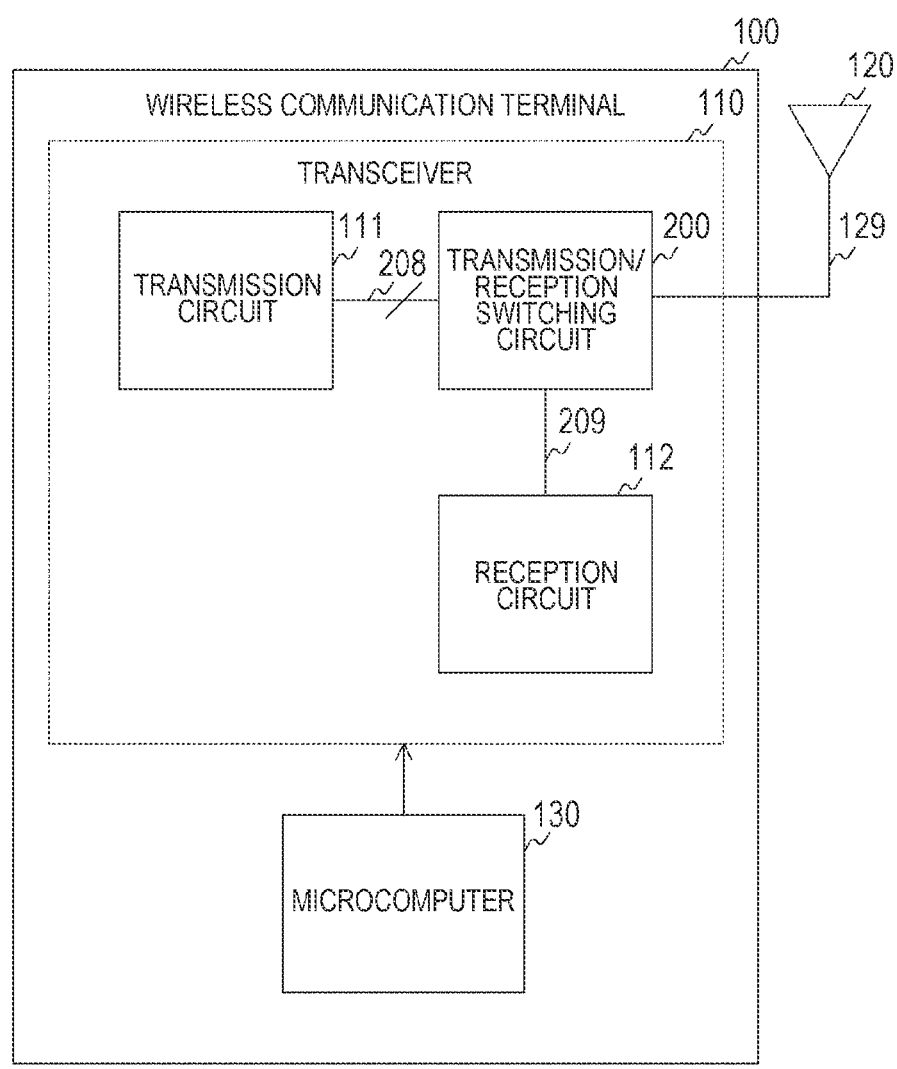
FIG. 1 is a block diagram illustrating a configuration example of a wireless communication terminal according to a first embodiment of the present technology.

FIG. 1 is a block diagram illustrating a configuration example of a wireless communication terminal 100 according to a first embodiment of the present technology. This wireless communication terminal 100 is a terminal that performs wireless communication, and includes a transceiver 110, an antenna 120, and a microcomputer 130.

The transceiver 110 is a circuit that performs transmission and reception, and includes a transmission circuit 111, a reception circuit 112, and a transmission/reception switching circuit 200.

The transmission circuit 111 generates a radio frequency (RF) signal as a transmission signal using a mixer, a digital to analog converter (DAC), or the like. This transmission circuit 111 supplies the transmission signal to the transmission/reception switching circuit 200 via a signal line 208.

The reception circuit 112 acquires an RF signal from the antenna 120 as a reception signal via the transmission/reception switching circuit 200 and processes the signal. This reception circuit 112 performs demodulation processing, analog to digital (AD) conversion processing, and the like using the mixer, an analog to digital converter (ADC), or the like.

The transmission/reception switching circuit 200 switches between transmission and reception under the control of the microcomputer 130. This transmission/reception switching circuit 200 supplies the transmission signal from the transmission circuit 111 to the antenna 120, and supplies the reception signal from the antenna 120 to the reception circuit 112 via a signal line 209.

The antenna 120 converts a transmission signal into an electromagnetic wave and converts the electromagnetic wave into a reception signal. This antenna 120 exchanges the transmission signal and the reception signal with the transmission/reception switching circuit 200 via the signal line 129.

The microcomputer 130 controls operation of the transceiver 110.

[Configuration Example of Transmission/Reception Switching Circuit]

Figure 2:
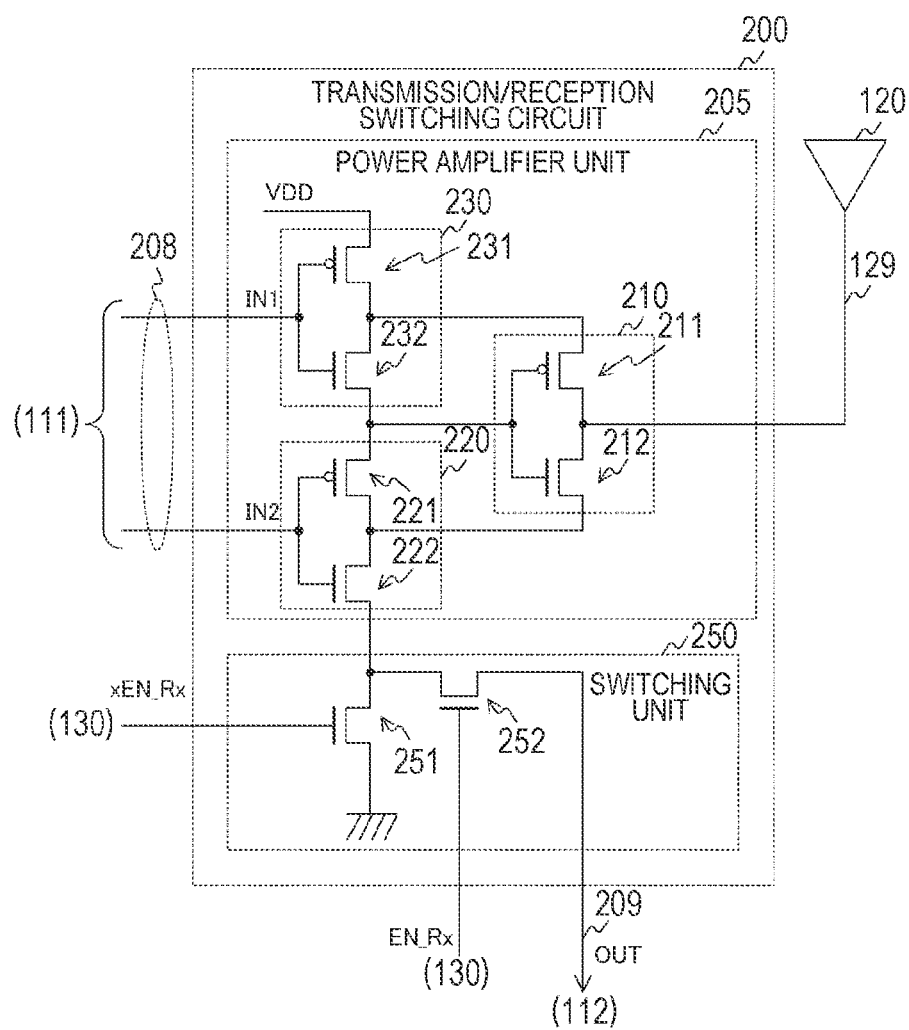
FIG. 2 is a circuit diagram illustrating a configuration example of a transmission/reception switching circuit according to the first embodiment of the present technology.

FIG. 2 is a circuit diagram illustrating a configuration example of the transmission/reception switching circuit 200 according to the first embodiment of the present technology. This transmission/reception switching circuit 200 includes a power amplifier unit 205 and a switching unit 250.

The power amplifier unit 205 includes inverters 210, 220, and 230. The inverter 210 includes a p-channel metal oxide semiconductor (pMOS) transistor 211 and an n-channel MOS (nMOS) transistor 212. Furthermore, the inverter 220 includes a pMOS transistor 221 and an nMOS transistor 222. The inverter 230 includes a pMOS transistor 231 and an nMOS transistor 232.

Note that the inverter 210 is an example of a first inverter described in the claims. The inverter 220 is an example of a second inverter described in the claims, and the inverter 230 is an example of a third inverter described in the claims.

The inverters 230 and 220 are connected in series to a power supply terminal of a power supply voltage VDD. In other words, the pMOS transistor 231, the nMOS transistor 232, the pMOS transistor 221, and the nMOS transistor 222 are connected in series to the power supply terminal.

Furthermore, a transmission signal IN1 from the transmission circuit 111 is input to gates of the pMOS transistor 231 and the nMOS transistor 232 (that is, an input terminal of the inverter 230). A transmission signal IN2 from the transmission circuit 111 is input to gates of the pMOS transistor 221 and the nMOS transistor 222 (that is, an input terminal of the inverter 220). As the transmission signals IN1 and IN2, in-phase rectangular waves (in other words, pulse signals) are used.

Furthermore, a connection node of the pMOS transistor 231 and the nMOS transistor 232 (that is, an output terminal of the inverter 230) is connected to a source of the pMOS transistor 211. A connection node of the pMOS transistor 221 and the nMOS transistor 222 (that is, an output terminal of the inverter 220) is connected to a source of the nMOS transistor 212.

Furthermore, gates of the pMOS transistor 211 and the nMOS transistor 212 (that is, an input terminal of the inverter 210) are connected to a connection node of the inverters 230 and 220. A connection node of the pMOS transistor 211 and the nMOS transistor 212 (that is, an output terminal of the inverter 210) is connected to the antenna 120.

With the above-described connection, the power amplifier unit 205 functions as a class D power amplifier that amplifies and outputs a pulse signal.

Note that the pMOS transistor 211 and the nMOS transistor 212 are examples of a first P-type transistor and a first N-type transistor described in the claims. The pMOS transistor 221 and the nMOS transistor 222 are examples of a second P-type transistor and a second N-type transistor described in the claims. The pMOS transistor 231 and the nMOS transistor 232 are examples of a third P-type transistor and a third N-type transistor described in the claims.

The switching unit 250 includes nMOS transistors 251 and 252. The nMOS transistor 251 opens and closes a path between a source of the nMOS transistor 222 and a ground terminal according to an enable signal xEN_Rx input to a gate.

The nMOS transistor 252 opens and closes a path between the source of the nMOS transistor 222 and the reception circuit 112 according to an enable signal EN_Rx input to a gate.

Here, the enable signal xEN_Rx is a signal obtained by inverting the enable signal EN_Rx. These enable signals EN_Rx and xEN_Rx are generated by the microcomputer 130 or the like. When the transceiver 110 performs reception, the microcomputer 130 sets the enable signal EN_Rx to a high level (enable). On the other hand, when the transceiver 110 performs transmission, the microcomputer 130 sets the enable signal EN_Rx to a low level (disable).

With the above-described connection, when the enable signal EN_Rx is at the low level (disable), the nMOS transistor 251 shifts to a closed state (that is, an on state), and the nMOS transistor 252 shifts to an open state (that is, an off state). When the nMOS transistor 251 is turned on, the source of the nMOS transistor 222 on a reception side of the power amplifier unit 205 and the ground terminal are short-circuited, and potential of the source is 0 volts (V). Furthermore, when the nMOS transistor 252 is turned off, the reception circuit 112 is insulated from the power amplifier unit 205.

On the other hand, when the enable signal EN_Rx is at the high level (enable), the nMOS transistor 251 shifts to the open state (off state), and the nMOS transistor 252 shifts to the closed state (on state). Therefore, a reception signal OUT is supplied to the reception circuit 112.

Furthermore, each of the nMOS transistors 251 and 252 can be replaced with a pMOS transistor. In this case, the low-level enable signal EN_Rx is input at the time of enabling.

Note that the nMOS transistor 251 is an example of a fourth transistor described in the claims. The nMOS transistor 252 is an example of a fifth transistor described in the claims.

Figure 3A:
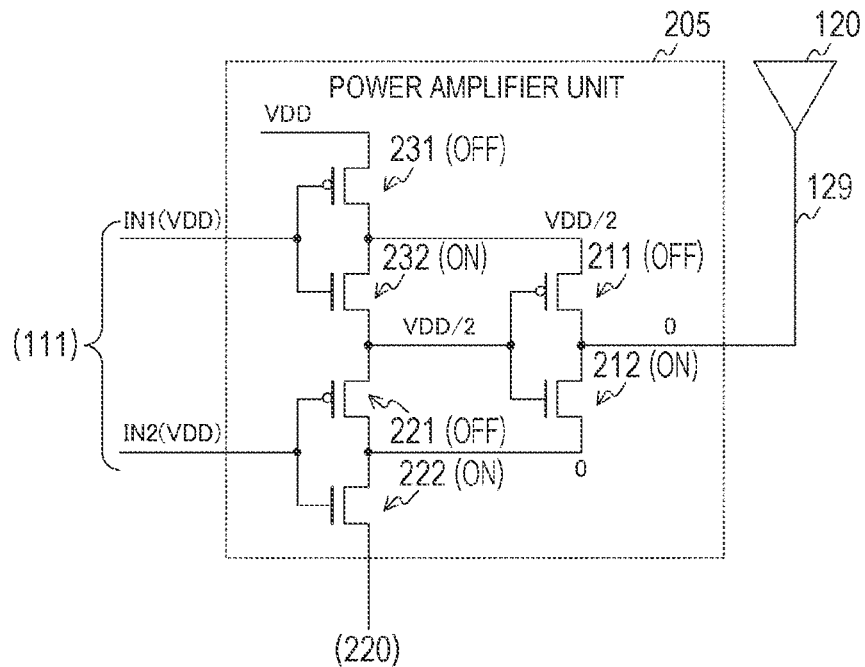
FIGS. 3A and 3B are diagrams for explaining operation of the transmission/reception switching circuit according to the first embodiment of the present technology.
Figure 3B:
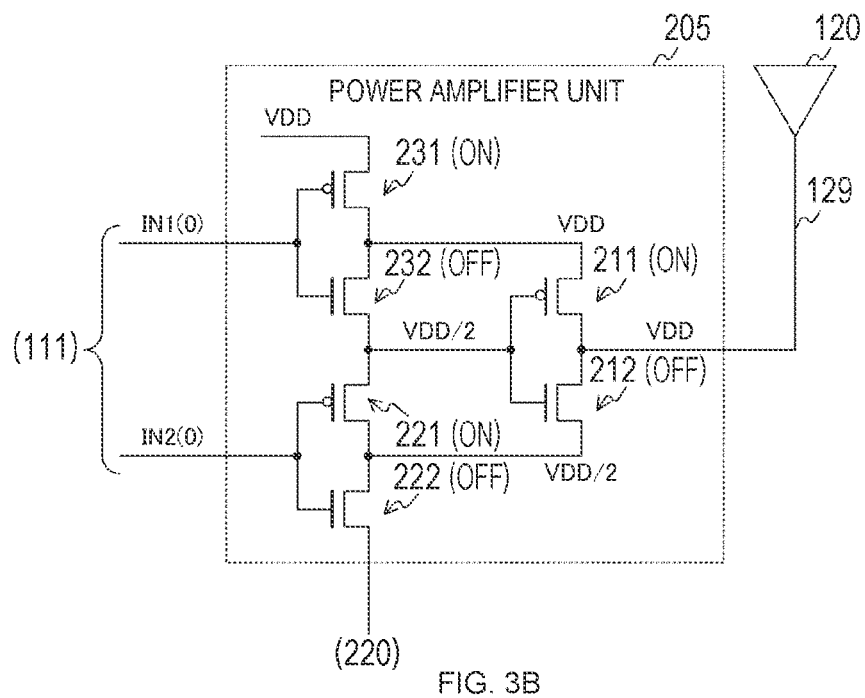

FIGS. 3A and 3B are diagrams for explaining operation of the transmission/reception switching circuit 200 according to the first embodiment of the present technology. It is assumed that the transmission signals IN1 and IN2 have amplitude between 0 volts (V) and VDD. FIG. 3A of the drawing illustrates a state of the power amplifier unit 205 when the transmission signals IN1 and IN2 are set to VDD. FIG. 3B of the drawing illustrates a state of the power amplifier unit 205 when the transmission signals IN1 and IN2 are set to 0 volts (V).

As illustrated in FIG. 3A of the drawing, in a case where the transmission signals IN1 and IN2 are set to VDD, the pMOS transistors 211, 221, and 231 shift to an off state, and the nMOS transistors 212, 222, and 232 shift to an on state. Furthermore, a level of the output terminal of the inverter 230 is VDD/2, and a level of the output terminal of the inverter 220 is 0 volts (V). A level of the input terminal of the inverter 220 is VDD/2, and a level of the output terminal thereof is 0 volts (V).

As illustrated in FIG. 3B of the drawing, in a case where the transmission signals IN1 and IN2 are set to 0 volts (V), the pMOS transistors 211, 221, and 231 shift to the on state, and the nMOS transistors 212, 222, and 232 shift to the off state. Furthermore, the level of the output terminal of the inverter 230 is VDD, and the level of the output terminal of the inverter 220 is VDD/2 volts (V). The level of the input terminal of the inverter 220 is VDD/2, and the level of the output terminal thereof is VDD.

As illustrated in the drawing, by inputting the in-phase transmission signals IN1 and IN2, an output of the inverter 230 has amplitude between VDD and VDD/2, and an output of the inverter 220 has amplitude between VDD/2 and 0. Furthermore, an input of the inverter 210 is always VDD/2 voltage. An output of the inverter 210 is VDD or 0 volts (V), and maximum voltage applied to each of the pMOS transistor 211 and the nMOS transistor 212 is VDD/2, so that a transistor having a configuration with a lower withstand voltage can be used. This enables highly efficient operation.

As described above, when the transceiver 110 performs transmission, the microcomputer 130 sets the enable signal EN_Rx to the low level (disable). The switching unit 250 cuts off the reception signal, and the transmission circuit 111 supplies the in-phase transmission signals IN1 and IN2.

On the other hand, when the transceiver 110 performs reception, the microcomputer 130 sets the enable signal EN_Rx to the high level (enable). The switching unit 250 supplies the reception signal OUT to the reception circuit 112. At this time, the transmission circuit 111 sets the transmission signals IN1 and IN2 to VDD during a reception period, and turns on the nMOS transistors 212 and 222 as illustrated in FIG. 3A of the drawing.

As described above, a part of the power amplifier unit 205 (the nMOS transistors 212 and 222) also functions as a switch that switches transmission and reception. Therefore, as compared with a case where the switch is inserted at a subsequent stage of the power amplifier unit 205, an area of an integrated circuit is reduced, and insertion loss caused by passing through the transmission/reception switching circuit 200 at the time of signal transmission can be reduced.

Furthermore, as will be described later in a second embodiment, even in a configuration using a highly versatile cascode-type power amplifier, a transmission/reception system can be configured to be small without hindering high efficiency characteristics. Even with a configuration using a class D power amplifier that can operate with a thin film transistor having good characteristics, it is possible to configure a transmission/reception system in a small size without hindering high efficiency characteristics.

By these effects, performance of the wireless communication terminal 100 can be improved.

As described above, according to the first embodiment of the present technology, since the nMOS transistors 212 and 222 in the power amplifier unit 205 function as switches for switching transmission and reception, it is possible to reduce the area of the integrated circuit, reduce the loss, and improve the efficiency. Therefore, the performance of the wireless communication terminal 100 can be improved.

First Modification

In the first embodiment described above, the nMOS transistors 251 and 252 are arranged in the switching unit 250. However, since a part of the power amplifier unit 205 functions as a switch, the nMOS transistor 252 can be eliminated. The transmission/reception switching circuit 200 in a first modification of the first embodiment is different from that of the first embodiment in that the nMOS transistor 252 is eliminated.

Figure 4:
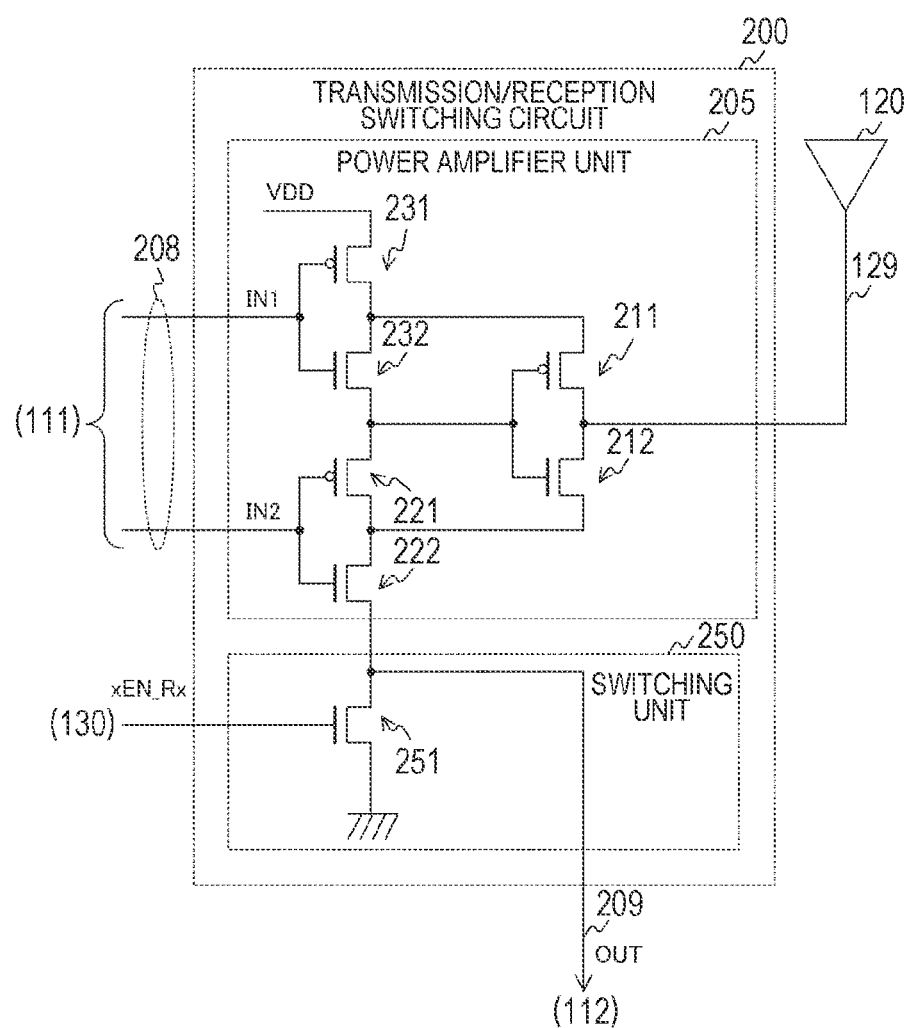
FIG. 4 is a circuit diagram illustrating a configuration example of a transmission/reception switching circuit in a first modification of the first embodiment of the present technology.

FIG. 4 is a circuit diagram illustrating a configuration example of the transmission/reception switching circuit 200 in the first modification of the first embodiment of the present technology. The transmission/reception switching circuit 200 in the first modification of the first embodiment is different from that of the first embodiment in that the nMOS transistor 252 is not arranged in the switching unit 250. The source of the nMOS transistor 222 is connected to the reception circuit 112.

As described above, according to the first modification of the first embodiment of the present technology, since the nMOS transistor 252 in the switching unit 250 is eliminated, a circuit scale can be reduced accordingly.

Second Modification

In the first embodiment described above, the in-phase transmission signals IN1 and IN2 are input to the power amplifier unit 205. However, there is a case where the phase between them is shifted and communication quality is deteriorated. The transmission/reception switching circuit 200 in a second modification of the first embodiment is different from that of the first embodiment in that a capacitor is provided in order to ensure compatibility of the transmission signals IN1 and IN2.

Figure 5:
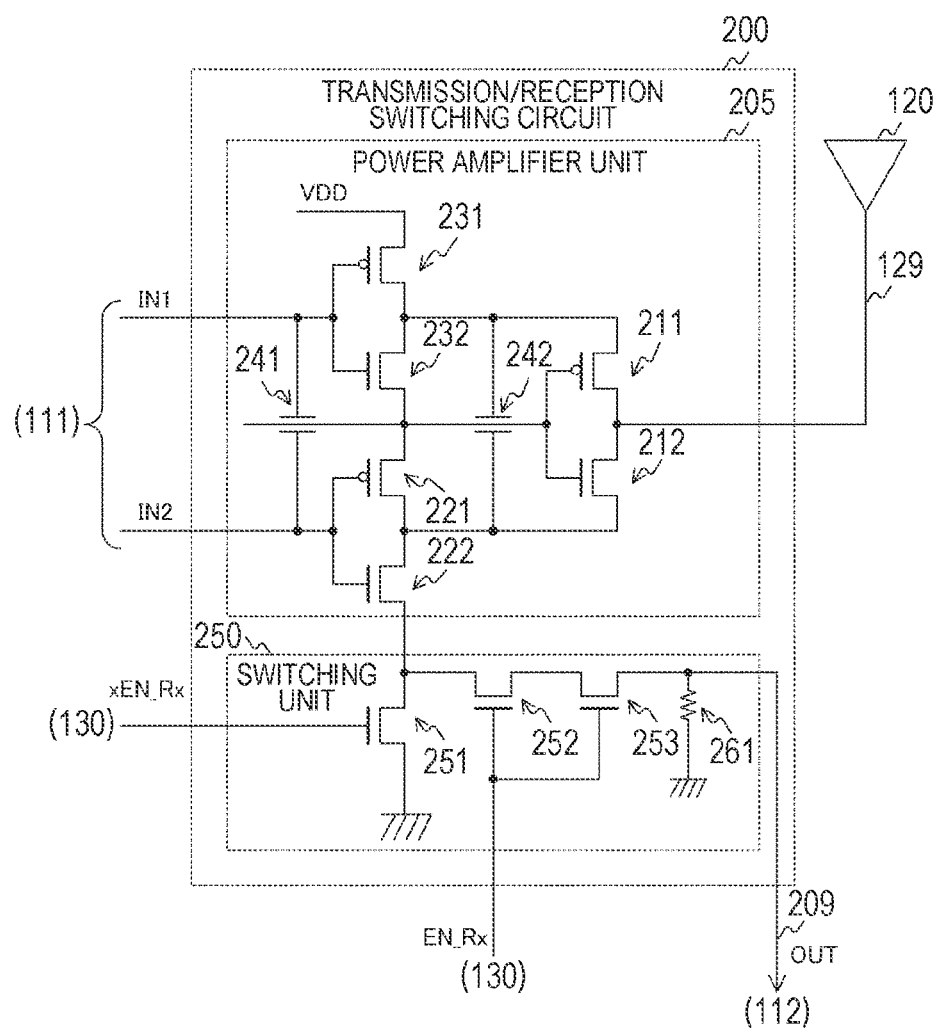
FIG. 5 is a circuit diagram illustrating a configuration example of a transmission/reception switching circuit in a second modification of the first embodiment of the present technology.

FIG. 5 is a circuit diagram illustrating a configuration example of the transmission/reception switching circuit 200 in the second modification of the first embodiment of the present technology. The transmission/reception switching circuit 200 in the second modification of the first embodiment is different from that of the first embodiment in that capacitors 241 and 242, an nMOS transistor 253, and a resistor 261 are further included.

The capacitor 241 is inserted between the input terminal of the inverter 230 and the input terminal of the inverter 220. For example, a through capacitor through which a signal line connected to a connection node of the inverters 230 and 220 passes is used as the capacitor 241.

The capacitor 242 is inserted between the output terminal of the inverter 230 and the output terminal of the inverter 220. For example, a through capacitor through which the signal line connected to the connection node of the inverters 230 and 220 passes is used as the capacitor 242.

The insertion of the capacitors 241 and 242 can ensure the compatibility of the transmission signals IN1 and IN2. Note that the capacitors 241 and 242 are examples of first and second in-amplifier capacitors described in the claims.

The nMOS transistors 252 and 253 are connected in series between the source of the nMOS transistor 222 and the reception circuit 112. The enable signal EN_Rx is input to gates of these nMOS transistors 252 and 253.

Since both the nMOS transistors 252 and 253 are turned off when the enable signal EN_Rx is at a low level (disable), insulation can be improved as compared with a case of only the nMOS transistor 252. Note that, although the two nMOS transistors are connected in series between the source of the nMOS transistor 222 and the reception circuit 112, three or more nMOS transistors can be connected in series.

Furthermore, each of the nMOS transistors 251 to 253 can be replaced with a pMOS transistor. In this case, the low-level enable signal EN_Rx is input at the time of enabling.

Note that the nMOS transistor 253 is an example of a fifth transistor described in the claims.

Furthermore, the resistor 261 is inserted between the ground terminal and a connection node of the nMOS transistor 253 and the reception circuit 112.

As described above, according to the second modification of the first embodiment of the present technology, since the capacitors 241 and 242 are inserted between the input and output terminals of the inverters 230 and 220, it is possible to improve communication quality by securing the compatibility of the transmission signals IN1 and IN2. Furthermore, the insulation can be improved by adding the nMOS transistor 253.

Third Modification

In the second modification of the first embodiment described above, the reception circuit 112 is insulated by the nMOS transistors 252 and 253. However, there is also a case where a leakage current flows through the nMOS transistors 252 and 253 in the off state and the insulation is insufficient. The transmission/reception switching circuit 200 in a third modification of the first embodiment is different from that in the second modification of the first embodiment in that insulation is improved by adding an nMOS transistor.

Figure 6:
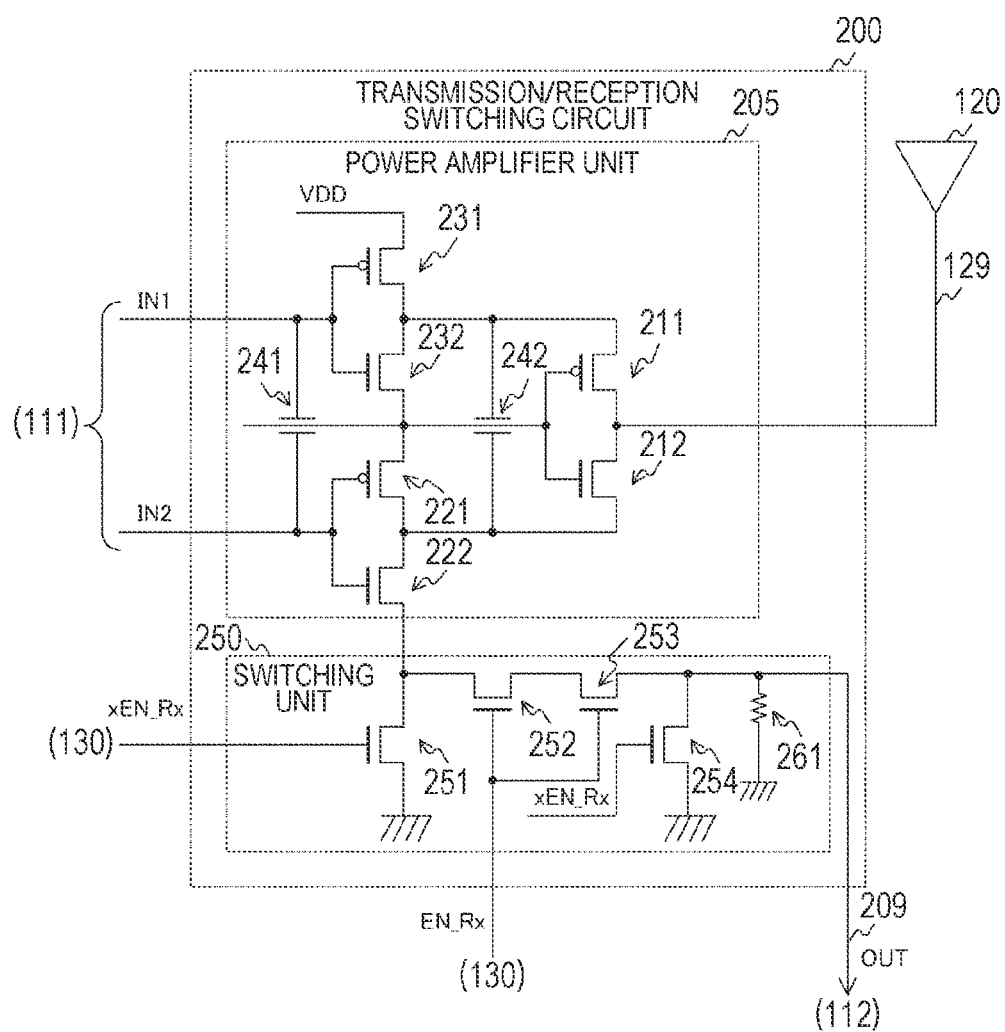
FIG. 6 is a circuit diagram illustrating a configuration example of a transmission/reception switching circuit in a third modification of the first embodiment of the present technology.

FIG. 6 is a circuit diagram illustrating a configuration example of the transmission/reception switching circuit 200 in the third modification of the first embodiment of the present technology. The transmission/reception switching circuit 200 in the third modification of the first embodiment is different from that in the second modification of the first embodiment in that an nMOS transistor 254 is further included.

The nMOS transistor 254 opens and closes a path between the ground terminal and a connection node of the nMOS transistor 254 and the reception circuit 112 according to the enable signal xEN_Rx. The enable signal xEN_Rx is input to a gate of the nMOS transistor 254. The nMOS transistor 254 functions as a shunt switch that causes a leakage current at the time of disabling to flow to the ground terminal. This can further improve insulation.

Furthermore, each of the nMOS transistors 251 to 254 can be replaced with a pMOS transistor. In this case, the low-level enable signal EN_Rx is input at the time of enabling.

As described above, according to the third modification of the first embodiment of the present technology, since the nMOS transistor 254 (shunt switch) is added, the insulation of the reception circuit 112 can be further improved.

Fourth Modification

In the second modification of the first embodiment described above, the power amplifier unit 205 is directly connected to the antenna 120. However, in this configuration, a direct current (DC) component may be produced in the transmission signal. The transmission/reception switching circuit 200 in a fourth modification of the first embodiment is different from that in the second modification of the first embodiment in that a capacitor is further arranged in a preceding stage of the antenna 120.

Figure 7:
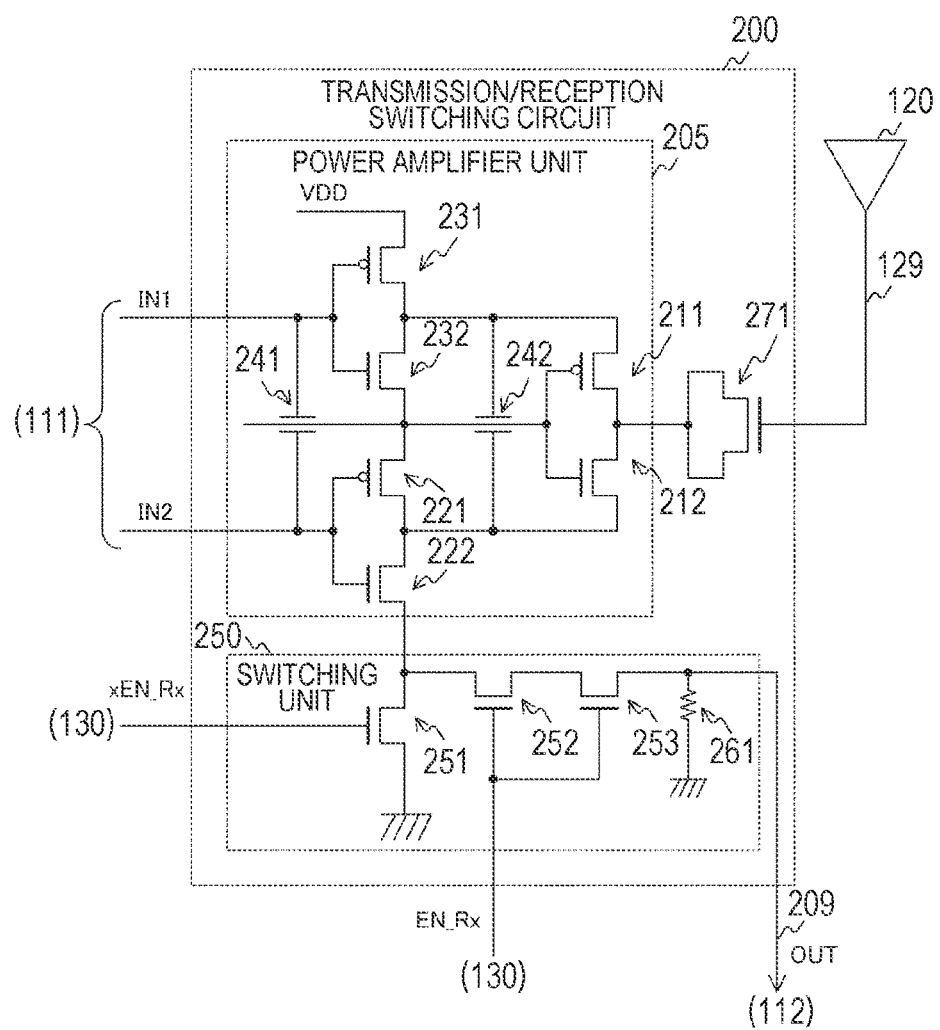
FIG. 7 is a circuit diagram illustrating a configuration example of a transmission/reception switching circuit in a fourth modification of the first embodiment of the present technology.

FIG. 7 is a circuit diagram illustrating a configuration example of the transmission/reception switching circuit 200 in the fourth modification of the first embodiment of the present technology. The transmission/reception switching circuit 200 in the fourth modification of the first embodiment is different from that in the second modification of the first embodiment in that an nMOS transistor 271 is further included.

A source and a drain of the nMOS transistor 271 are connected to the output terminal of the inverter 210. Furthermore, a gate of the nMOS transistor 271 is connected to the antenna 120. In other words, a MOS capacitor of the nMOS transistor 271 is inserted between the output terminal of the inverter 210 and the antenna 120. By inserting this MOS capacitor, the DC component can be cut. Note that a capacitor can be inserted instead of the MOS capacitor of the nMOS transistor 271.

Note that the MOS capacitor of the nMOS transistor 271 is an example of a DC cut capacitor described in the claims.

As described above, according to the fourth modification of the first embodiment of the present technology, since the MOS capacitor of the nMOS transistor 271 is inserted in the preceding stage of the antenna 120, the DC component can be cut.

Fifth Modification

In the second modification of the first embodiment described above, the power amplifier unit 205 is directly connected to the antenna 120, but impedance matching may be required between them. The transmission/reception switching circuit 200 in a fifth modification of the first embodiment is different from that in the second modification of the first embodiment in that a circuit for matching impedance is further arranged.

Figure 8:
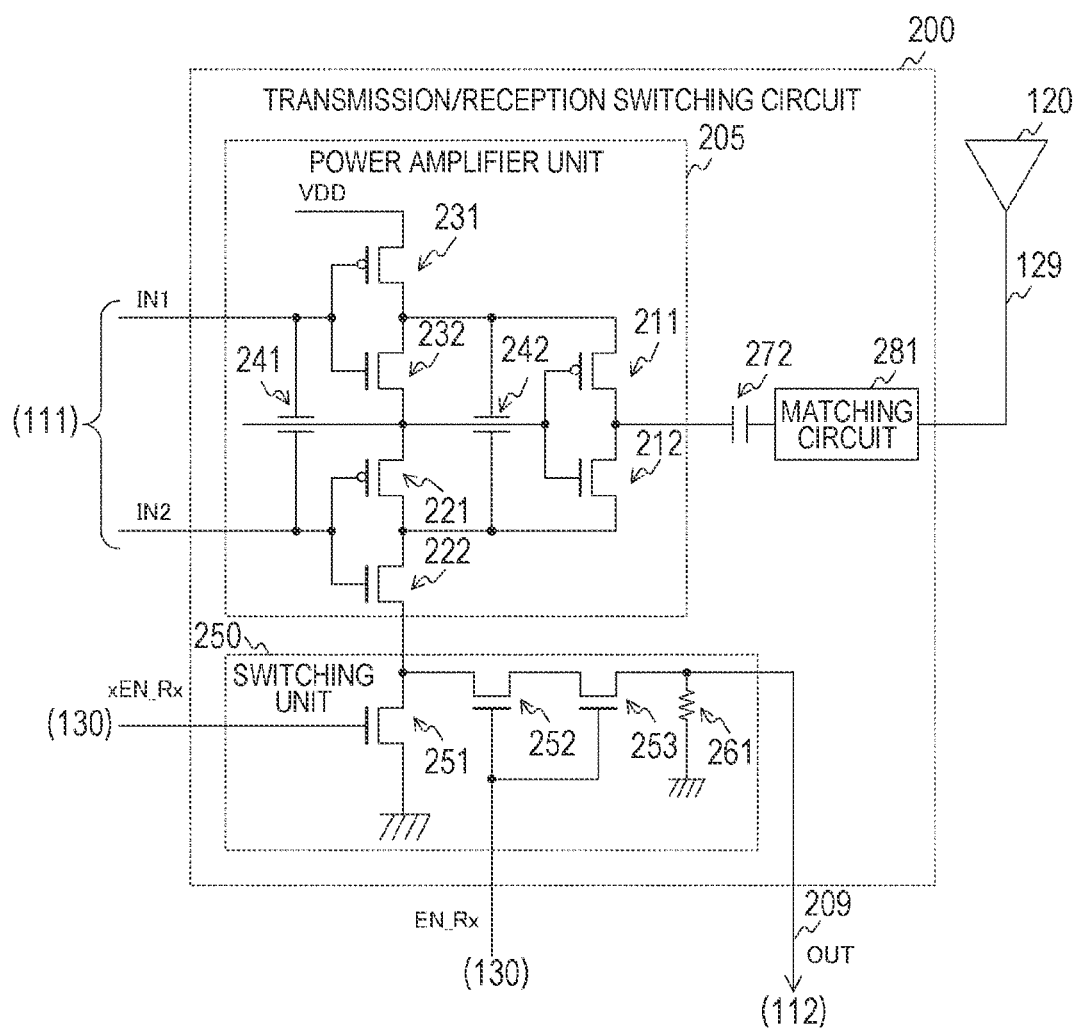
FIG. 8 is a circuit diagram illustrating a configuration example of a transmission/reception switching circuit in a fifth modification of the first embodiment of the present technology.

FIG. 8 is a circuit diagram illustrating a configuration example of the transmission/reception switching circuit 200 in the fifth modification of the first embodiment of the present technology. The transmission/reception switching circuit 200 of the fifth modification of the first embodiment is different from that in the second modification of the first embodiment in that a capacitor 272 and a matching circuit 281 are further included.

The capacitor 272 and the matching circuit 281 are inserted between the power amplifier unit 205 and the antenna 120. The matching circuit 281 matches impedance between the power amplifier unit 205 and the antenna 120. The addition of the matching circuit 281 can improve transmission efficiency and suppress signal reflection.

Figure 9:
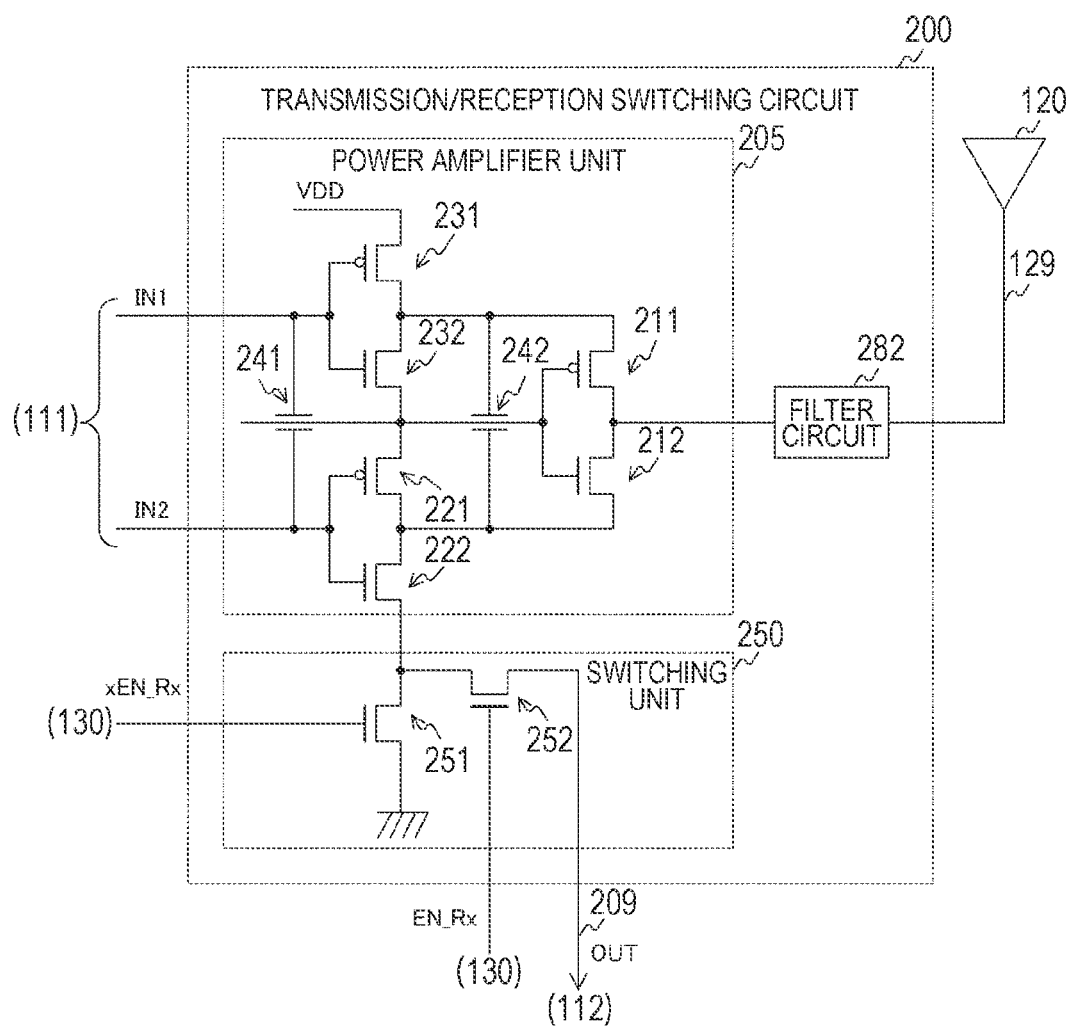
FIG. 9 is a circuit diagram illustrating a configuration example of a transmission/reception switching circuit provided with a filter circuit in the fifth modification of the first embodiment of the present technology.

Note that, as illustrated in FIG. 9, a filter circuit 282 can be disposed instead of the capacitor 272 and the matching circuit 281. As the filter circuit 282, a low-pass filter, a band-pass filter, or the like is assumed. Furthermore, the matching circuit 281 can be disposed in the power amplifier unit 205 (a preceding stage of the inverter 210 or the like).

Note that the configurations of the power amplifier unit 205 illustrated in each of FIGS. 2 and 4 to 9 and the other circuits (the switching unit 250, the matching circuit 281, and the like) can be arbitrarily combined as necessary. For example, the switching unit 250 in FIG. 4 and the power amplifier unit 205 in FIG. 5 can be combined.

As described above, according to the fifth modification of the first embodiment of the present technology, since the matching circuit 281 is added, the transmission efficiency can be improved and the signal reflection can be suppressed.

2. Second Embodiment

In the above-described first embodiment, the three inverters (inverters 210, 220, and 230) are arranged in the power amplifier unit 205, but a pair of transistors connected in a cascode manner can be arranged instead of these inverters. The transmission/reception switching circuit 200 in a second embodiment is different from that of the first embodiment in that a pair of cascode-connected transistors is used.

Figure 10:
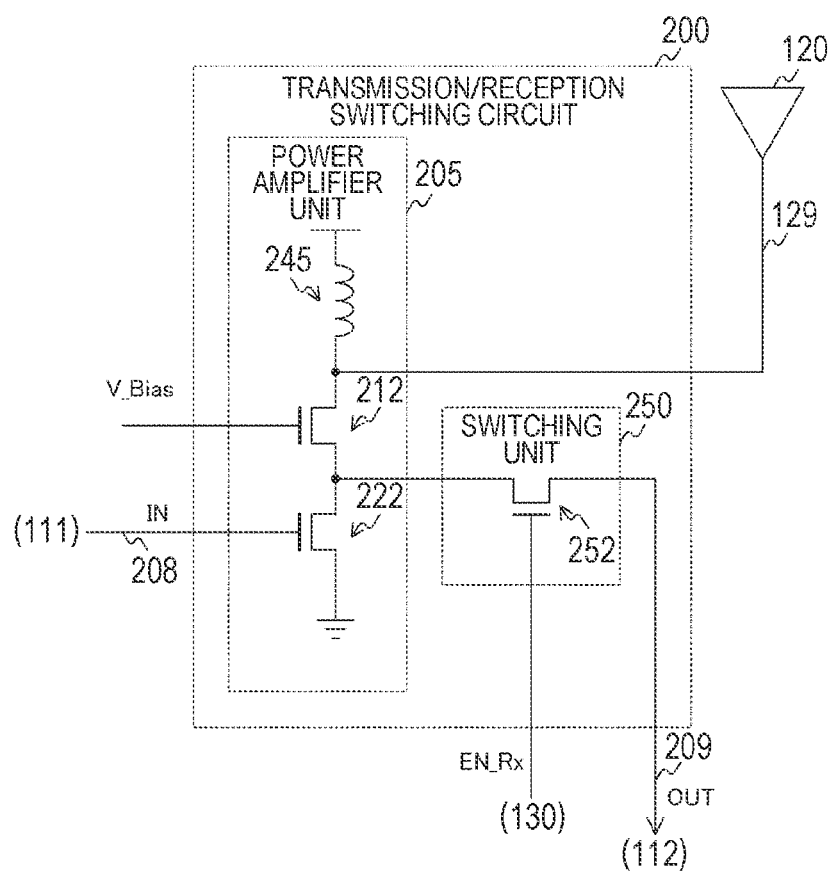
FIG. 10 is a circuit diagram illustrating a configuration example of a transmission/reception switching circuit according to a second embodiment of the present technology.

FIG. 10 is a circuit diagram illustrating a configuration example of the transmission/reception switching circuit 200 in the second embodiment of the present technology. In this second embodiment, an inductor 245 and the nMOS transistors 212 and 222 are disposed in the power amplifier unit 205 instead of the inverters 210, 220, and 230. Furthermore, only the nMOS transistor 252 is arranged in the switching unit 250.

The inductor 245 and the nMOS transistors 212 and 222 are connected in series between the power supply terminal and the ground terminal. Furthermore, a constant bias voltage V Bias is applied to the gate of the nMOS transistor 212. A transmission signal IN from the transmission circuit 111 is input to the gate of the nMOS transistor 222.

Furthermore, the nMOS transistor 252 in the switching unit 250 opens and closes a path between a connection node of the nMOS transistors 212 and 222 and the reception circuit 112 according to the enable signal EN_Rx. Note that the nMOS transistor 252 can be replaced with a pMOS transistor. In this case, the low-level enable signal EN_Rx is input at the time of enabling.

Furthermore, in the second embodiment, when the transceiver 110 performs reception, the transmission circuit 111 sets the transmission signal IN to a low level during a reception period, and turns off the nMOS transistor 222.

As illustrated in the drawing, by disposing the inductor 245 and the nMOS transistors 212 and 222 instead of the inverters 210, 220, and 230, the number of transistors can be reduced as compared with a case of using the three inverters.

As described above, according to the second embodiment of the present technology, since the inductor 245 and the nMOS transistors 212 and 222 are used instead of the three inverters, the number of transistors can be reduced.

First Modification

In the second embodiment described above, the power amplifier unit 205 is directly connected to the antenna 120, but impedance matching is may be required therebetween. The transmission/reception switching circuit 200 in a first modification of the second embodiment is different from that of the second embodiment in that a circuit for matching impedance is further arranged.

Figure 11:
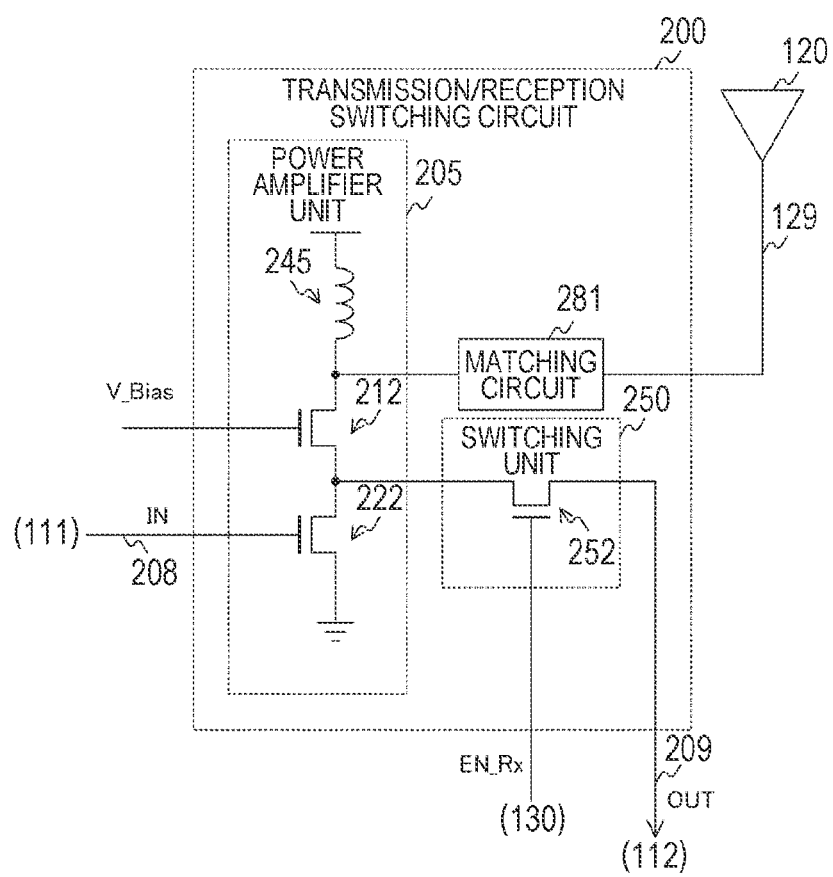
FIG. 11 is a circuit diagram illustrating a configuration example of a transmission/reception switching circuit in a first modification of the second embodiment of the present technology.

FIG. 11 is a circuit diagram illustrating a configuration example of the transmission/reception switching circuit 200 in the first modification of the second embodiment of the present technology. The transmission/reception switching circuit 200 of the first modification of the second embodiment is different from that of the second embodiment in that the matching circuit 281 is further included. The matching circuit 281 is inserted between the power amplifier unit 205 and the antenna 120.

Figure 12:
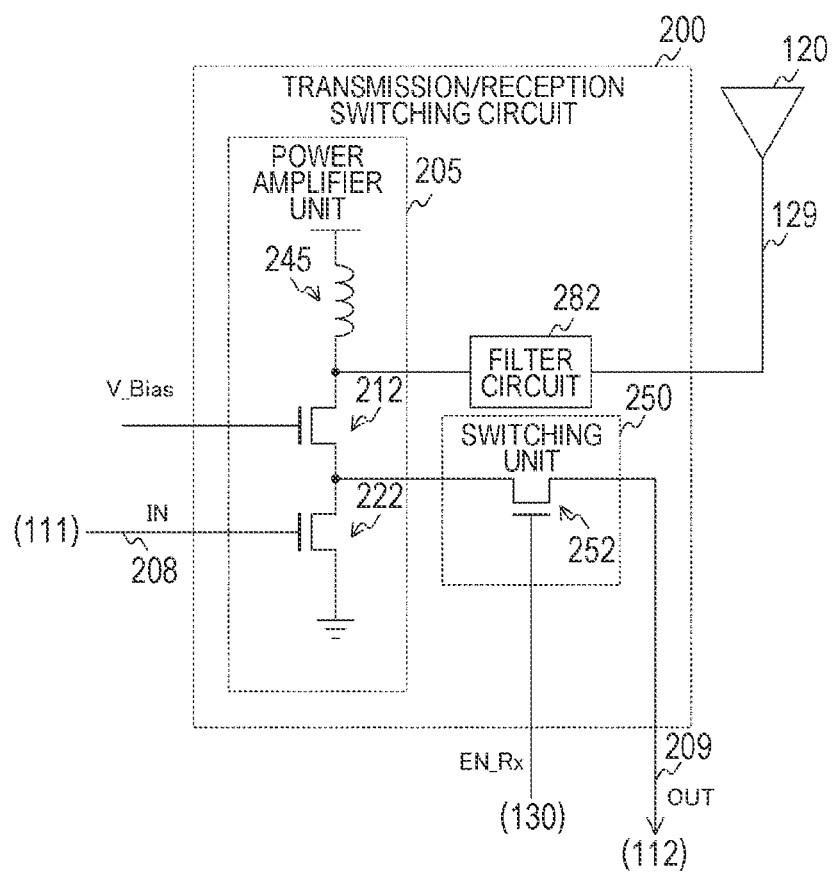
FIG. 12 is a circuit diagram illustrating a configuration example of a transmission/reception switching circuit provided with a filter circuit in the first modification of the second embodiment of the present technology.

Note that, as illustrated in FIG. 12, the filter circuit 282 can be disposed instead of the matching circuit 281.

As described above, according to the first modification of the second embodiment of the present technology, since the matching circuit 281 is added, transmission efficiency can be improved and reflection of a signal can be suppressed.

Second Modification

In the second embodiment described above, the nMOS transistor 252 is disposed in the switching unit 250, but the nMOS transistor 252 can be eliminated. The transmission/reception switching circuit 200 in a second modification of the second embodiment is different from that of the second embodiment in that the nMOS transistor 252 is eliminated.

Figure 13:
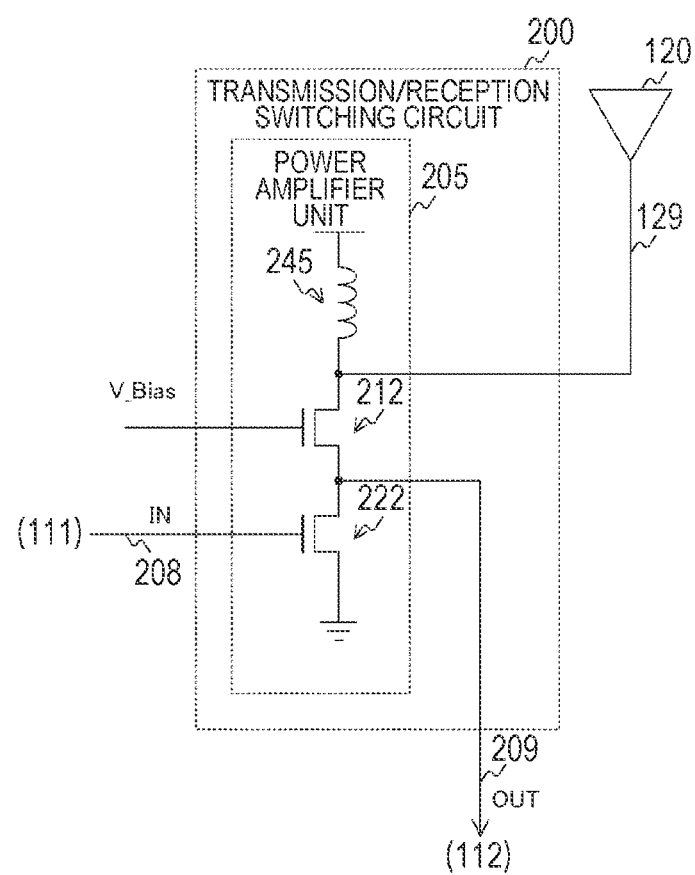
FIG. 13 is a circuit diagram illustrating a configuration example of a transmission/reception switching circuit in a second modification of the second embodiment of the present technology.

FIG. 13 is a circuit diagram illustrating a configuration example of the transmission/reception switching circuit 200 in the second modification of the second embodiment of the present technology. The transmission/reception switching circuit 200 in the second modification of the second embodiment is different from that of the second embodiment in that the nMOS transistor 252 is not arranged. The connection node of the nMOS transistors 212 and 222 is connected to the reception circuit 112.

As described above, according to the second modification of the second embodiment of the present technology, since the nMOS transistor 252 in the switching unit 250 is eliminated, a circuit scale can be reduced accordingly.

Third Modification

In the second embodiment described above, the reception circuit 112 is insulated by the nMOS transistor 252, but there is also a case where a leakage current flows through the nMOS transistor 252 in the off state and the insulation is insufficient. The transmission/reception switching circuit 200 in a third modification of the second embodiment is different from that of the second embodiment in that insulation is improved by adding an nMOS transistor.

Figure 14:
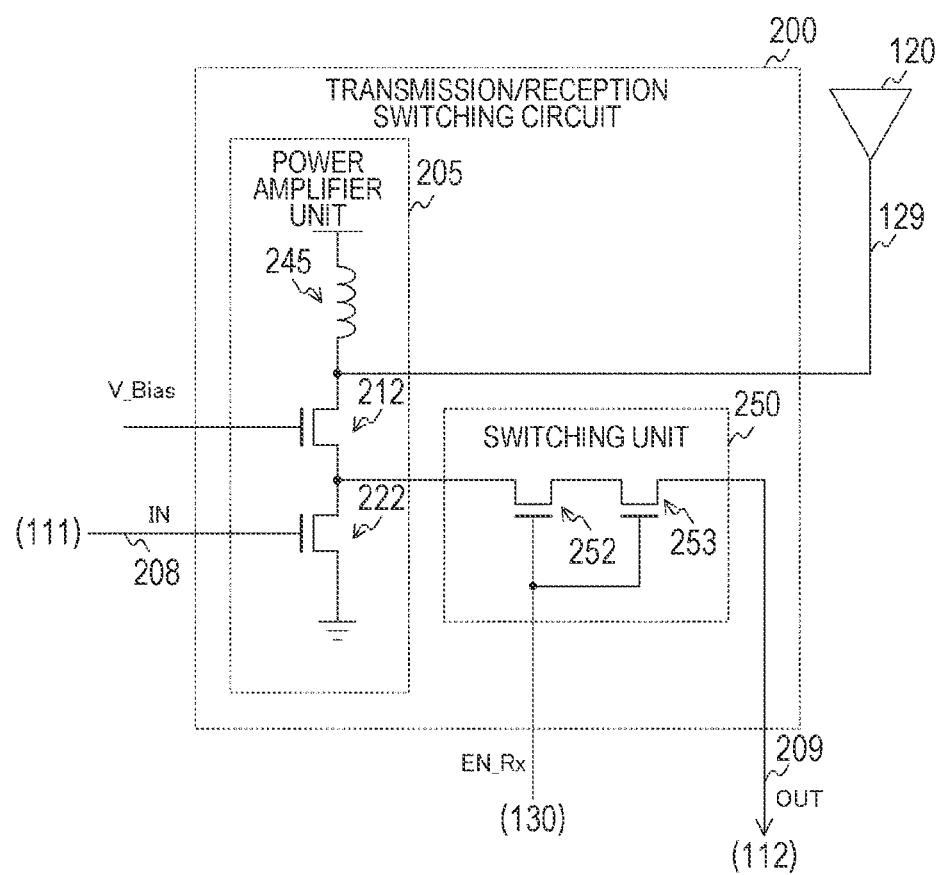
FIG. 14 is a circuit diagram illustrating a configuration example of a transmission/reception switching circuit in a third modification of the second embodiment of the present technology.

FIG. 14 is a circuit diagram illustrating a configuration example of the transmission/reception switching circuit 200 in the third modification of the second embodiment of the present technology. The transmission/reception switching circuit 200 in the third modification of the second embodiment is different from that of the second embodiment in that the nMOS transistor 253 is further included.

The nMOS transistors 252 and 253 are connected in series between the connection node of the nMOS transistors 212 and 222 and the reception circuit 112. The enable signal EN_Rx is input to the gates of these nMOS transistors 252 and 253.

Note that, although the two nMOS transistors are connected in series between the connection node of the nMOS transistors 212 and 222 and the reception circuit 112, three or more nMOS transistors can be connected in series.

Furthermore, each of the nMOS transistors 252 and 253 can be replaced with a pMOS transistor. In this case, the low-level enable signal EN_Rx is input at the time of enabling.

As described above, according to the third modification of the second embodiment of the present technology, the insulation can be improved by adding the nMOS transistor 253.

Fourth Modification

In the third modification of the second embodiment described above, the nMOS transistors 212 and 222 are cascode-connected, but it may be difficult to secure a withstand voltage of the nMOS transistor 212 on a ground side at the time of reception. The transmission/reception switching circuit 200 in a fourth modification of the second embodiment is different from that in the third modification of the second embodiment in that the withstand voltage is secured by series connection of nMOS transistors.

Figure 15:
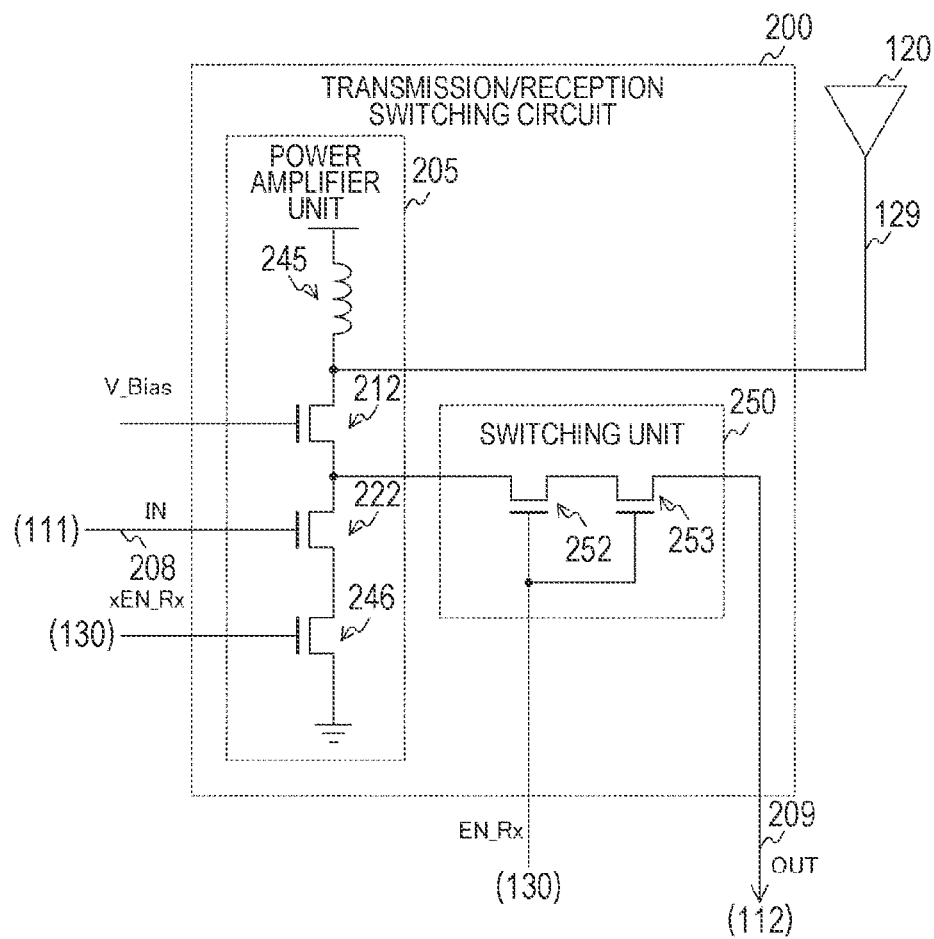
FIG. 15 is a circuit diagram illustrating a configuration example of a transmission/reception switching circuit in a fourth modification of the second embodiment of the present technology.

FIG. 15 is a circuit diagram illustrating a configuration example of the transmission/reception switching circuit 200 in the fourth modification of the second embodiment of the present technology. The transmission/reception switching circuit 200 in the fourth modification of the second embodiment is different from that in the third modification of the second embodiment in that an nMOS transistor 246 is further included.

The nMOS transistor 246 opens and closes a path between the source of the nMOS transistor 222 and the ground terminal according to the enable signal xEN_Rx input to a gate. By connecting in series with the nMOS transistor 246, drain-source voltage of each of the nMOS transistors 222 and 246 in the off state at the time of reception can be lowered, and a required withstand voltage can be lowered and easily secured.

Note that, although only the nMOS transistor 246 is inserted between the source of the nMOS transistor 222 and the ground terminal, two or more nMOS transistors may be arranged according to the required withstand voltage.

Note that the nMOS transistor 246 is an example of a fourth transistor described in the claims.

Furthermore, the configurations of the power amplifier unit 205 illustrated in each of FIGS. 10 to 15 and the other circuits (the switching unit 250, the matching circuit 281, and the like) can be arbitrarily combined as necessary. For example, the switching unit 250 in FIG. 10 and the power amplifier unit 205 in FIG. 15 can be combined.

As described above, according to the fourth modification of the present technology, since the nMOS transistor 246 is disposed between the source of the nMOS transistor 222 and the ground terminal, it is easy to secure the withstand voltage of the nMOS transistor 212.

3. Application Example

The technology according to the present disclosure can be applied to a technology called Internet of things (IoT), which is a so-called "Internet of things". IoT is a mechanism in which IoT devices 9100 that are "things" are connected to another IoT device 9003, the Internet, a cloud 9005, and the like, and mutually control by exchanging information. IoT can be used in various industries such as agriculture, home, automobile, manufacturing, distribution, and energy.

Figure 16:
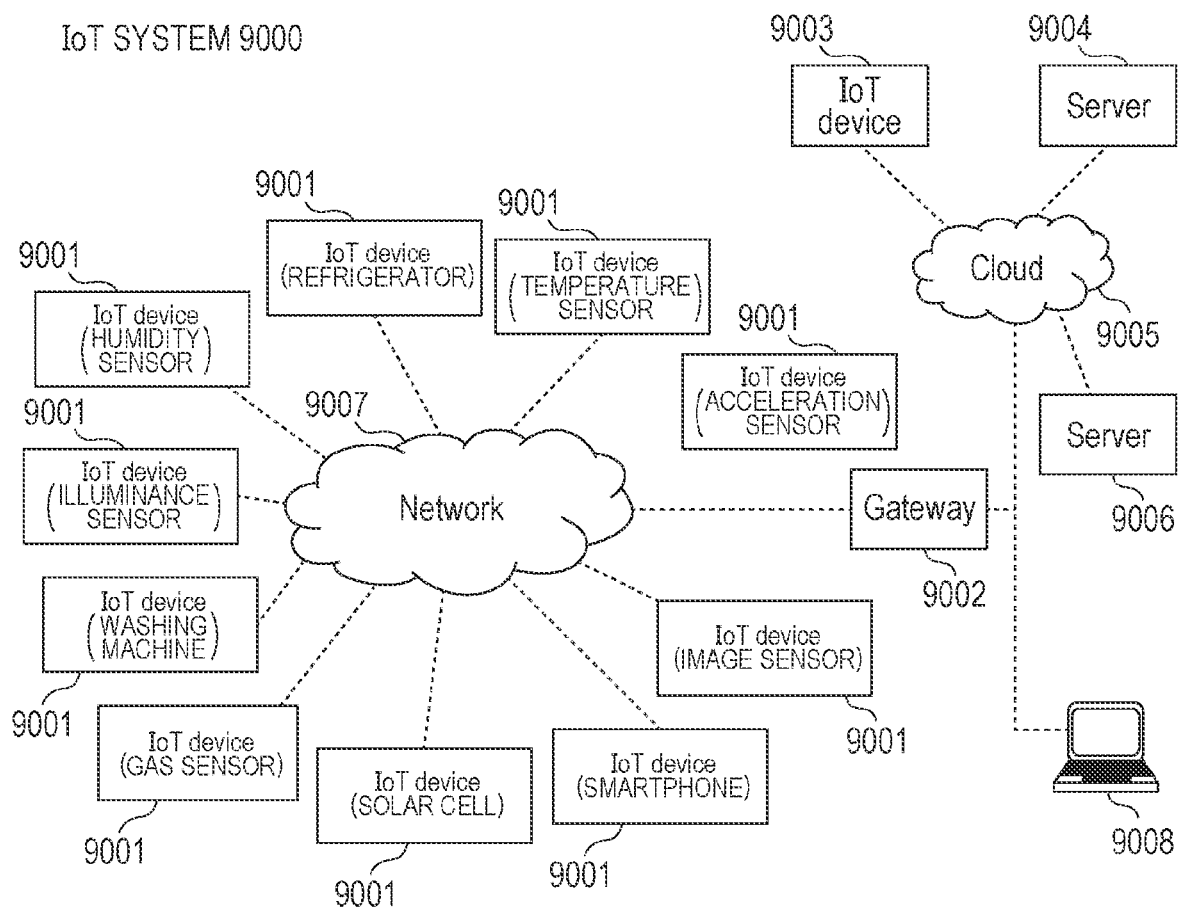
FIG. 16 is a diagram illustrating an example of a schematic configuration of an IoT system to which the technology according to the present disclosure is applicable.

FIG. 16 is a diagram illustrating an example of a schematic configuration of an IoT system 9000 to which the technology according to the present disclosure can be applied.

The IoT devices 9001 include a variety of sensors such as temperature, humidity, illuminance, acceleration, distance, image, gas, and human sensors. Further, the IoT devices 9001 may additionally include terminals such as a smartphone, a mobile phone, a wearable terminal, and a gaming device. The IoT devices 9001 are powered, for example, by an alternating current (AC) power supply, a direct current (DC) power supply, a battery, a non-contact power supply, energy harvesting or the like. The IoT devices 9001 are capable, for example, of wired, wireless, and short-range wireless communication. Communication schemes suitably used are third-generation (3G)/LTE, wireless fidelity (Wi-Fi), institute of electrical and electronic engineers (IEEE) 802.15.4, Bluetooth, Zigbee (registered trademark), and Z-Wave. The IoT devices 9001 may switch between the plurality of these communication sections to achieve communication.

The IoT devices 9001 may form one-to-one, star, tree, and mesh networks. The IoT devices 9001 may connect to the external cloud 9005 directly or via a gateway 9002. An address is assigned to each of the IoT devices 9001, for example, by internet protocol version (IPv) 4, IPv6, or IPv6 over low power wireless personal area networks (6LowPAN). Data collected from the IoT devices 9001 is sent to the other IoT device 9003, a server 9004, the cloud 9005, and so on. The timings and frequency for sending data from the IoT devices 9001 may be suitably adjusted for transmission of data in a compressed form. Such data may be used in an 'as-is' manner or analyzed by a computer 9008 by various sections such as statistical analysis, machine learning, data mining, cluster analysis, discriminant analysis, combinational analysis, and chronological analysis. Such use of data enables provision of numerous services including control, warning, monitoring, visualization, automation, and optimization.

The technology according to an embodiment of the present disclosure is also applicable to home-related devices and services. The IoT devices 9001 in homes include washing machine, drying machine, dryer, microwave oven, dish washing machine, refrigerator, oven, electric rice cooker, cooking appliances, gas appliances, fire alarm, thermostat, air-conditioner, television (TV) set, recorder, audio appliances, lighting appliances, electric water heater, hot water dispenser, vacuum cleaner, electric fan, air purifier, security camera, lock, door-shutter opener/closer, sprinkler, toilet, thermometer, weighing scale, sphygmomanometer and the like. Further, the IoT devices 9001 may include solar cell, fuel cell, storage battery, gas meter, electric power meter, and distribution panel.

A low power consumption communication scheme is desirable as a communication scheme for the IoT devices 9001 in homes. Furthermore, the IoT devices 9001 may communicate by Wi-Fi indoors and by 3G/LTE outdoors. An external server 9006 designed to control IoT devices may be provided on the cloud 9005 to control the IoT devices 9001. The IoT devices 9001 send data including statuses of home appliances, temperature, humidity, power consumption, and presence or absence of humans and animals indoors and outdoors. Data sent from the home appliances is accumulated in the external server 9006 via the cloud 9005. New services are made available based on such data. The IoT devices 9001 designed as described above can be controlled by voice using voice recognition technologies.

In addition, direct transmission of information from the home appliances to the TV set permits visualization of the statuses of the home appliances. Further, determination of whether or not the resident is at home and transmission of data to air-conditioners and lighting appliances by various sensors makes it possible to turn the power thereof on and off. Still further, advertisements can be shown on the displays provided to various home appliances via the Internet.

An example of the IoT system 9000 to which the technology according to the present disclosure can be applied has been described above. The technology according to the present disclosure can be suitably applied to the IoT devices 9001 among the configurations described above. Specifically, the wireless communication terminal 100 in FIG. 1 can be applied to the IoT devices 9001. By applying the technology according to the present disclosure to the IoT devices 9001, performance of the IoT devices 9001 can be improved.

Note that the above-described embodiments show examples for embodying the present technology, and the matters in the embodiments and the matters specifying the invention in the claims have a corresponding relationship with each other. Similarly, the matters specifying the invention in the claims and the matters in the embodiments of the present technology having the same name have a corresponding relationship with each other. However, the present technology is not limited to the embodiments, and can be embodied by applying various modifications to the embodiments without departing from the gist thereof.

Note that the effects described in the present specification are merely examples and are not limited, and furthermore, there may be other effects.

Note that the present technology can also have the following configurations.

(1) A transmission/reception switching circuit including:
a first N-type transistor having a drain connected to an antenna and a gate to which a constant voltage is applied; and
a second N-type transistor having a drain connected to a source of the first N-type transistor, having a gate to which a transmission signal is input, and supplying a reception signal from one of a source and the drain.

(2) The transmission/reception switching circuit according to (1), further including:
a first P-type transistor;
a second P-type transistor;
a third P-type transistor; and
a third N-type transistor, in which
the transmission signal includes in-phase first and second transmission signals,
a third inverter including the third P-type transistor and the third N-type transistor and a second inverter including the second P-type transistor and the second N-type transistor are connected in series to a power supply terminal,
the first transmission signal is input to an input terminal of the third inverter,
an output terminal of the third inverter is connected to a source of the first P-type transistor,
the second transmission signal is input to an input terminal of the second inverter,
an output terminal of the second inverter is connected to the source of the first N-type transistor,
an input terminal of a first inverter including the first P-type transistor and the first N-type transistor is connected to a connection node of the second and third inverters, and
an output terminal of the first inverter is connected to the antenna.

(3) The transmission/reception switching circuit according to (2), further including: a first in-amplifier capacitor inserted between the input terminal of the second inverter and the input terminal of the third inverter; and
a second in-amplifier capacitor inserted between the output terminal of the second inverter and the output terminal of the third inverter.

(4) The transmission/reception switching circuit according to (2) or (3), further including a direct current (DC) cut capacitor inserted between the output terminal of the first inverter and the antenna.

(5) The transmission/reception switching circuit according to any one of (2) to (4), further including a matching circuit inserted between the output terminal of the first inverter and the antenna.

(6) The transmission/reception switching circuit according to any one of (2) to (4), further including a filter circuit inserted between the output terminal of the first inverter and the antenna.

(7) The transmission/reception switching circuit according to any one of (2) to (6), further including a switching unit that opens and closes a path between the source of the second N-type transistor and a ground terminal according to a predetermined enable signal.

(8) The transmission/reception switching circuit according to (7), in which the switching unit includes a fourth transistor that opens and closes the path between the source of the second N-type transistor and the ground terminal according to the enable signal.

(9) The transmission/reception switching circuit according to (8), in which the switching unit further includes the predetermined number of fifth transistors that open and close a path between the source of the second N-type transistor and a reception circuit that processes the reception signal according to the enable signal.

(10) The transmission/reception switching circuit according to (9), in which the switching unit further includes a shunt switch that opens and closes a path between the ground terminal and a connection node of the fifth transistor and the reception circuit according to the enable signal.

(11) The transmission/reception switching circuit according to (1), further including an inductor inserted between a power supply terminal and the drain of the first N-type transistor.

(12) The transmission/reception switching circuit according to (11), further including a matching circuit inserted between the antenna and a connection node of the first N-type transistor and the inductor.

(13) The transmission/reception switching circuit according to (11), further including a filter circuit inserted between the antenna and a connection node of the first N-type transistor and the inductor.

(14) The transmission/reception switching circuit according to any one of (11) to (13), further including the predetermined number of fourth transistors that open and close a path between the source of the second N-type transistor and a ground terminal according to the enable signal.

(15) The transmission/reception switching circuit according to any one of (11) to (14), further including a switching unit that opens and closes a path between a connection node of the first and second N-type transistors and a reception circuit that processes the reception signal according to a predetermined enable signal.

(16) The transmission/reception switching circuit according to (15), in which the switching unit includes the predetermined number of fifth transistors that open and close the path between the connection node of the first and second N-type transistors and the reception circuit according to the enable signal.

(17) A wireless communication terminal including:
a first N-type transistor having a drain connected to an antenna and a gate to which a constant voltage is applied;
a second N-type transistor having a drain connected to a source of the first N-type transistor, having a gate to which a transmission signal is input, and supplying a reception signal from one of a source and the drain;
a transmission circuit that supplies the transmission signal; and
a reception circuit that processes the reception signal.

REFERENCE SIGNS LIST

100 Wireless communication terminal
110 Transceiver
111 Transmission circuit
112 Reception circuit
120 Antenna
130 Microcomputer
200 Transmission/reception switching circuit
205 Power amplifier unit
210, 220, 230 Inverter
211, 221, 231 pMOS transistor
212, 222, 232, 246, 251 to 254, 271 nMOS transistor
241, 242, 272 Capacitor
245 Inductor
250 Switching unit
261 Resistor
281 Matching circuit
282 Filter circuit
9001 IoT device

The invention claimed is:

1. A transmission/reception switching circuit, comprising:
a first N-type transistor having a drain connected to an antenna and a gate to which a constant voltage is applied; and
a second N-type transistor having a drain connected to a source of the first N-type transistor, having a gate to which a transmission signal is input, and supplying a reception signal from one of a source and the drain.

2. The transmission/reception switching circuit according to claim 1, further comprising:
a first P-type transistor;
a second P-type transistor;
a third P-type transistor; and
a third N-type transistor, wherein
the transmission signal includes in-phase first and second transmission signals,
a third inverter including the third P-type transistor and the third N-type transistor and a second inverter including the second P-type transistor and the second N-type transistor are connected in series to a power supply terminal,
the first transmission signal is input to an input terminal of the third inverter,
an output terminal of the third inverter is connected to a source of the first P-type transistor,
the second transmission signal is input to an input terminal of the second inverter,
an output terminal of the second inverter is connected to the source of the first N-type transistor,
an input terminal of a first inverter including the first P-type transistor and the first N-type transistor is connected to a connection node of the second and third inverters, and
an output terminal of the first inverter is connected to the antenna.

3. The transmission/reception switching circuit according to claim 2, further comprising: a first in-amplifier capacitor inserted between the input terminal of the second inverter and the input terminal of the third inverter; and
a second in-amplifier capacitor inserted between the output terminal of the second inverter and the output terminal of the third inverter.

4. The transmission/reception switching circuit according to claim 2, further comprising a direct current (DC) cut capacitor inserted between the output terminal of the first inverter and the antenna.

5. The transmission/reception switching circuit according to claim 2, further comprising a matching circuit inserted between the output terminal of the first inverter and the antenna.

6. The transmission/reception switching circuit according to claim 2, further comprising a filter circuit inserted between the output terminal of the first inverter and the antenna.

7. The transmission/reception switching circuit according to claim 2, further comprising a switching unit that opens and closes a path between the source of the second N-type transistor and a ground terminal according to a predetermined enable signal.

8. The transmission/reception switching circuit according to claim 7, wherein the switching unit includes a fourth transistor that opens and closes the path between the source of the second N-type transistor and the ground terminal according to the predetermined enable signal.

9. The transmission/reception switching circuit according to claim 8, wherein the switching unit further includes a predetermined number of fifth transistors that open and close a path between the source of the second N-type transistor and a reception circuit that processes the reception signal according to the predetermined enable signal.

10. The transmission/reception switching circuit according to claim 9, wherein the switching unit further includes a shunt switch that opens and closes a path between the ground terminal and a connection node of a fifth transistor of the predetermined number of fifth transistors and the reception circuit according to the predetermined enable signal.

11. The transmission/reception switching circuit according to claim 1, further comprising an inductor inserted between a power supply terminal and the drain of the first N-type transistor.

12. The transmission/reception switching circuit according to claim 11, further comprising a matching circuit inserted between the antenna and a connection node of the first N-type transistor and the inductor.

13. The transmission/reception switching circuit according to claim 11, further comprising a filter circuit inserted between the antenna and a connection node of the first N-type transistor and the inductor.

14. The transmission/reception switching circuit according to claim 11, further comprising a predetermined number of fourth transistors that open and close a path between the source of the second N-type transistor and a ground terminal according to a predetermined enable signal.

15. The transmission/reception switching circuit according to claim 11, further comprising a switching unit that opens and closes a path between a connection node of the first and second N-type transistors and a reception circuit that processes the reception signal according to a predetermined enable signal.

16. The transmission/reception switching circuit according to claim 15, wherein the switching unit includes a predetermined number of fifth transistors that open and close the path between the connection node of the first and second N-type transistors and the reception circuit according to the predetermined enable signal.

17. A wireless communication terminal, comprising:
- a first N-type transistor having a drain connected to an antenna and a gate to which a constant voltage is applied;
- a second N-type transistor having a drain connected to a source of the first N-type transistor, having a gate to which a transmission signal is input, and supplying a reception signal from one of a source and the drain;
- a transmission circuit that supplies the transmission signal; and
- a reception circuit that processes the reception signal.

* * * * *